UNITED STATES PATENT OFFICE.

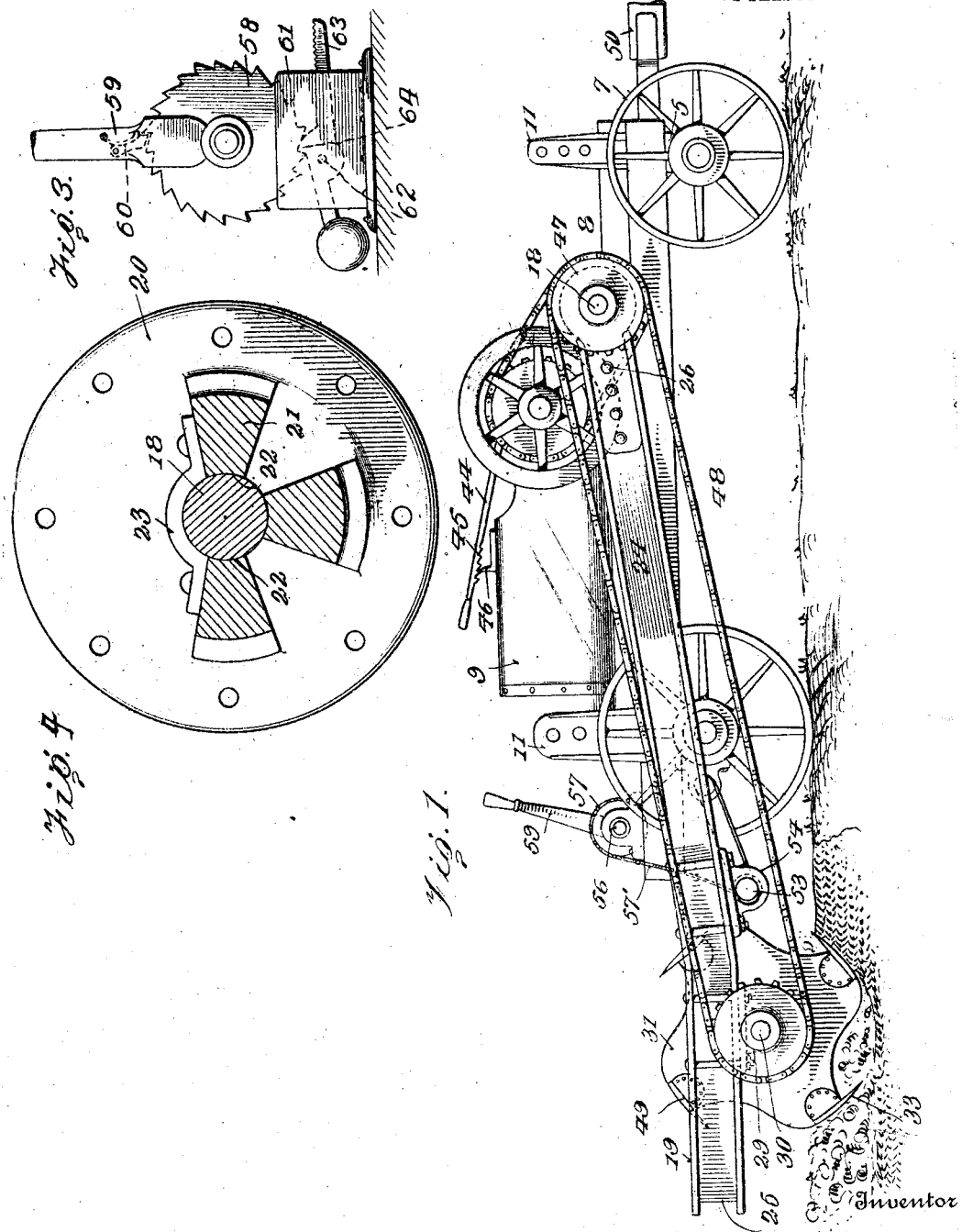

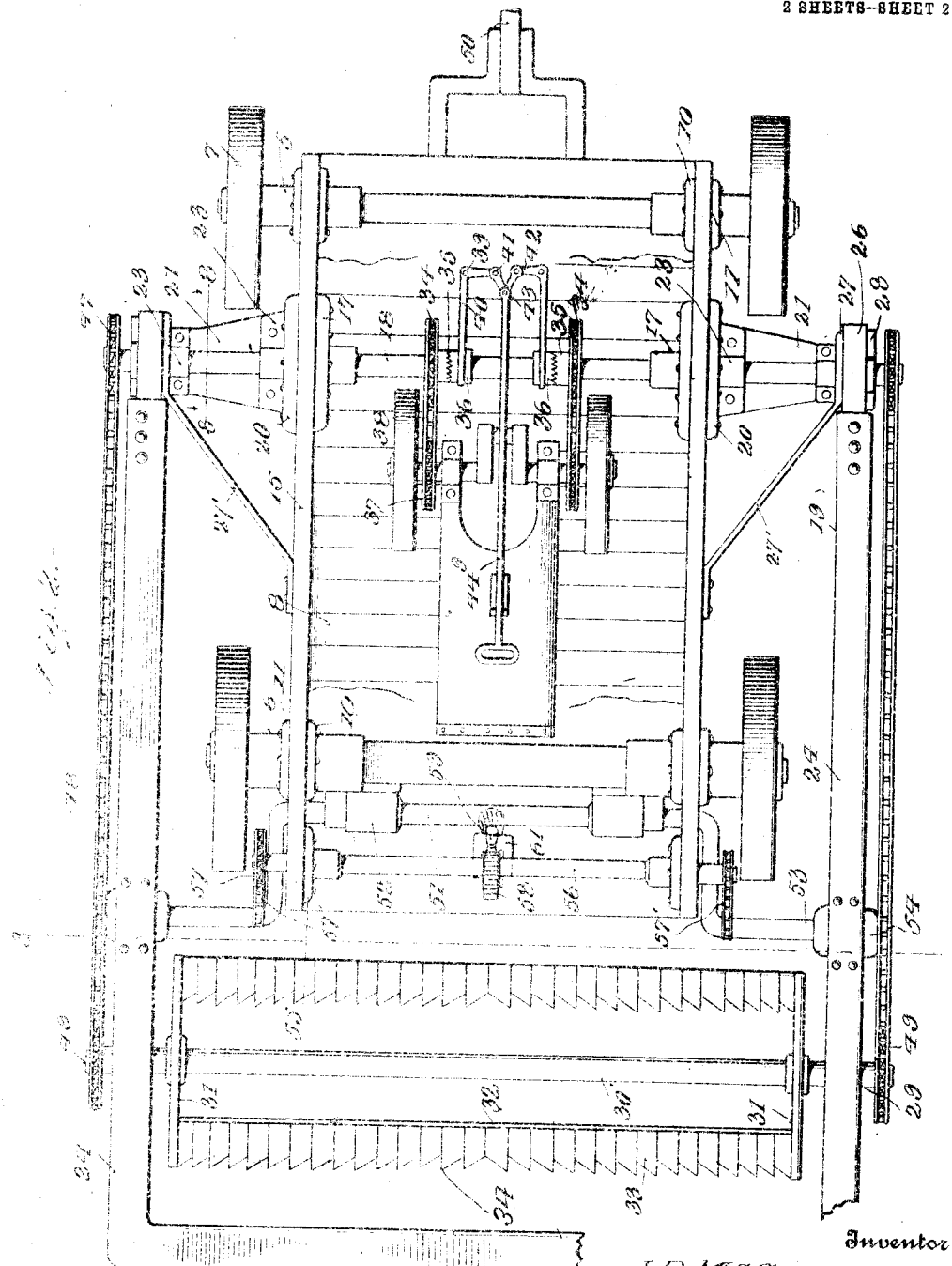

JOSIAH R. McCOY, OF MARSHALLTOWN, IOWA.

EARTH-CHIPPING MACHINE.

1,025,475.  Specification of Letters Patent.  Patented May 7, 1912.

Application filed July 14, 1910.  Serial No. 572,000.

*To all whom it may concern:*

Be it known that I, JOSIAH R. McCOY, citizen of the United States, residing at Marshalltown, in the county of Marshall and State of Iowa, have invented certain new and useful Improvements in Earth-Chipping Machines, of which the following is a specification.

This invention relates to earth chipping machines and has for its object the provision of a machine of simple and durable construction, adapted to be advanced over a hillside or a level stretch of ground for the purpose of loosening the tillable soil so as to catch and retain the rain fall, and thus enrich the earth and at the same time prevent the surface soil from being washed away.

A further object is to provide an earth chipping machine including a wheeled truck having a cutter mounted for rotation on the rear end thereof and adapted to pass through the soil and loosen the latter without throwing the soil on either side of said cutter.

A further object is to provide improved means for raising and lowering the cutter, and means for locking said cutter in different positions of adjustment.

A still further object of the invention is generally to improve this class of machines so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation of an earth chipping machine constructed in accordance with my invention; Fig. 2 is a top plan view of the same; Fig. 3 is a side elevation of the pawl and ratchet mechanism for elevating the cutter carrying frame; Fig. 4 is a transverse sectional view taken on the line 8—8 of Fig. 2, and looking in the direction of the arrow.

Corresponding and like parts are referred to in the following description and indicated in all the views of the drawings by the same reference characters.

The improved earth chipping machine forming the subject matter of the present invention comprises a wheeled truck including front and rear bolsters 5 and 6 having axles secured thereto and on which are mounted for rotation ground wheels 7.

Mounted on the bolsters 5 and 6 is a platform 8 adapted to receive and support an engine 9 of any suitable construction. Secured to the opposite ends of each bolster are brackets 10 and 11, between which are interposed longitudinally disposed sides or sills 15. Secured to the inner faces of the side bars or sills 15 are bearings 17, in which is journaled a transverse driving shaft 18, the opposite ends of the driving shaft 18 being extended longitudinally beyond the sills 15 to form a support for the pivoted cutter carrying frame indicated at 19. Fastened to the outer faces of the side sills or beams 15, are disks or flanges 20, having a plurality of spaced lugs 21 secured to and extending laterally therefrom, the inner edges of the lugs being curved or rounded at 22 to form a bearing for the driving shaft 18. Detachably secured to some of the lugs 21, are strap irons 23 also curved to conform to the shape of the shaft 18 and which serve to prevent accidental displacement of said shaft.

The cutter carrying frame comprises oppositely disposed longitudinal bars 24 preferably formed of channel iron and having their rear ends connected by a transverse bar 25 also preferably formed of channel iron. Secured to the forward ends of the side bars 24 are sockets 26 which receive the adjacent ends of the driving shaft 18 said driving shaft forming the pivotal axis of the frame so as to permit said frame to be raised or lowered, as best shown in Fig. 1 of the drawings.

Interposed between each bearing or socket 26 and the ends of the adjacent lugs 21, is a spacing washer 27 and disposed on the opposite side of each socket is a nut 28 which engages a threaded portion on the shaft 18 and serves to prevent accidental displacement of the cutter carrying frame. Depending from the cutter carrying frame at the closed end thereof, are bearings 29 in which is journaled the transverse shaft 30 of the earth chipping device or cutter.

The cutter comprises spaced heads 31 connected at spaced intervals by longitudinally disposed bars 32 to which are bolted, riveted or otherwise rigidly secured a series of cutting blades 33. The free ends of the cutting blades 33 are preferably inclined or beveled to produce terminal points 34 which enter the ground and loosen the soil without throwing the earth on either side of the cutter. The free ends of the blades 33 on opposite sides of the center of the cutter are preferably inclined in opposite directions, but if desired, all of said cutters may be inclined in the same direction.

It will here be noted that the earth chipping device or cutter projects longitudinally beyond the ground wheels of the truck so that after a portion of a hillside or level stretch of ground has been chipped, and the machine is advanced parallel with said chipped portion, a firm footing will be afforded for the draft animal or animals. It will also be noted that the cutters penetrate the ground a considerable depth so as to loosen the tillable soil, thus to catch and retain the rain fall and consequently enrich the soil and at the same time prevent the surface soil from being washed away.

Rotatably mounted on the driving shaft 18 are spaced sprocket wheels 34 having clutch members 35 secured thereto and which engage corresponding clutch members 36 splined on the driving shaft, said sprocket wheels being connected to similar sprocket wheels 37 on the engine shaft through the medium of sprocket chains 38, thus to transmit motion from the engine to the driving shaft.

Pivotally mounted at 39 on the platform or other portion of the truck, are bell crank levers 40, the long arms of which are operatively connected to the clutch members 36, while the free ends thereof are pivotally connected at 41 to suitable links 42. The links 42 are both pivotally connected at 43 with an operating rod 44 extending in the direction of the engine. The free end of the operating lever 43 is provided with a terminal finger loop or handle, while the lower edge thereof is provided with spaced teeth 45 which engage a lug or projection 46 on the engine cylinder and by means of which the clutch members may be locked into or out of engagement with each other.

Keyed or otherwise rigidly secured to the opposite ends of the driving shaft 18, are sprocket wheels 47, which latter are connected through the medium of sprocket chains 48 with similar sprocket wheels 49 mounted on the adjacent ends of the cutter shaft 30 so that motion may be transmitted from the driving shaft 18 to the cutter for the purpose of revolving the latter.

The machine may be advanced in any suitable manner over the surface of tillable soil, but it is preferred to provide the forward end of the truck with a tongue 50 to which may be attached draft animals.

As a means for raising and lowering the cutter carrying frame, there is provided a crank shaft 51 having its offset portion journaled in suitable bearings 52 secured to the rear bolster 6. The crank shaft 51 is provided with terminal arms 53 which extend beneath the side bars 24 of the cutter carrying frame and are journaled in suitable bearings 54 secured to the lower longitudinal edges thereof, as best shown in Fig. 1 of the drawings, there being sufficient lost motion of the arms 53 within the bearings 54 to permit vertical adjustment of the cutter carrying frame without binding or wedging action between the parts.

Secured to the inner faces of the side bars or sills 15 at the rear of the bolster 6, are oppositely disposed brackets or bearings 55 in which is journaled a stub shaft 56. The opposite ends of the stub shaft 56 project through openings in the side bars 15 and are provided with terminal sprocket wheels 57 to which are connected sprocket chains 57', said sprocket chains being also connected to the adjacent arm 53 of the crank shaft 51 so that when the stub shaft 56 is rotated, the cutter carrying frame may be raised or lowered as desired. Secured to the intermediate portion of the stub shaft 56, is a ratchet wheel 58 and journaled on the shaft on the opposite sides of the ratchet wheel, is an operating lever 59 having a pawl 60 adapted to engage the ratchet teeth when the lever is oscillated, thus to rotate the shaft to effect the adjustment of the cutter carrying frame. Arranged beneath the ratchet wheel 58, is a casing or housing 61, in which is pivotally mounted at 62, a weighted pawl 63 having an intermediate tooth 64 adapted to engage the teeth on the ratchet wheel 58. Thus it will be seen that by depressing the reduced end of the pawl 63, the tooth 64 will be disengaged from the ratchet wheel, so that by oscillating the lever 59, the sprocket wheels 57 will be rotated and through the medium of the chains 57' elevate the chipping device to regulate the depth of cutting thereof, the pawl 63, by engagement with the ratchet wheel 58, serving to lock the frame and cutter in adjusted position. The washers 27 are preferably formed with inclined braces 27' for attachment to the side sills 15, thus to assist in supporting the driving shaft and also to reinforce the trunk frame.

It will here be noted that the construction of the cutter shown in Fig. 1 of the drawings, is such that the blades thereof pass through the soil without throwing the latter on either side of the cutter, so that the soil thus treated, will be in condition to receive and retain the rain fall, which latter has a tendency to rot the soil and thus dispense with the use of fertilizer, while at the same time causing the soil to be thoroughly irrigated.

Having thus described the invention, what is claimed as new is:

1. A machine of the class described including a wheeled truck, a driving shaft, a tilting frame having one end thereof pivotally mounted on the driving shaft, a cutter mounted for rotation on said frame at the free end thereof, a motor operatively connected with said driving shaft, a crank shaft journaled on the truck and provided with crank arms engaging the opposite sides of the frame, a stub shaft disposed above the crank shaft, flexible connections between the stub shaft and crank arms, a ratchet wheel secured to the crank shaft, a lever pivotally mounted on said stub shaft and adapted to engage the ratchet wheel for elevating the frame, a pawl engaging the ratchet wheel for holding the frame in adjusted position, and means for transmitting motion from the driving shaft to the cutter.

2. A machine of the class described including a wheeled truck, a driving shaft, a frame pivotally mounted on the opposite ends of the driving shaft and including side bars spaced from the adjacent sides of the truck, a cutter mounted for rotation on the free end of said frame, a crank shaft having its intermediate portion journaled on the truck and its opposite ends provided with crank arms journaled in the side bars of the frame, a stub shaft disposed above the crank shaft, sprocket wheels secured to the opposite ends of the stub shaft, sprocket chains forming a connection between the sprocket wheels and crank arms, means for rotating the stub shaft to effect the vertical adjustment of the frame, means for holding the frame in adjusted position, a motor mounted on the truck, a connection between the motor and driving shaft, and a connection between said driving shaft and cutter for transmitting motion from one to the other.

In testimony whereof, I affix my signature in presence of two witnesses.

JOSIAH R. McCOY. [L. S.]

Witnesses:
M. H. Hill,
I. W. Bauldin.